(12) United States Patent
Vautard et al.

(10) Patent No.: US 9,617,398 B2
(45) Date of Patent: Apr. 11, 2017

(54) MULTIFUNCTIONAL CURING AGENTS AND THEIR USE IN IMPROVING STRENGTH OF COMPOSITES CONTAINING CARBON FIBERS EMBEDDED IN A POLYMERIC MATRIX

(71) Applicant: UT-Battelle, LLC, Oak Ridge, TN (US)

(72) Inventors: Frederic Vautard, Knoxville, TN (US); Soydan Ozcan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 467 days.

(21) Appl. No.: 14/107,416

(22) Filed: Dec. 16, 2013

(65) Prior Publication Data
US 2016/0102180 A1 Apr. 14, 2016

(51) Int. Cl.
| C08K 9/00 | (2006.01) |
| C08J 5/06 | (2006.01) |
| D06M 15/55 | (2006.01) |
| D06M 101/40 | (2006.01) |

(52) U.S. Cl.
CPC .............. C08J 5/06 (2013.01); D06M 15/55 (2013.01); C08J 2367/06 (2013.01); D06M 2101/40 (2013.01); D06M 2200/40 (2013.01)

(58) Field of Classification Search
CPC ................. B26N 3/10; B32B 9/00; C08J 5/06
See application file for complete search history.

(56) References Cited

U.S. PATENT DOCUMENTS

| 2,958,704 A | 11/1960 | Dinbergs et al. |
| 3,707,486 A | 12/1972 | Oertel et al. |
| 3,763,110 A | 10/1973 | Oertel et al. |
| 3,898,258 A | 8/1975 | Van Helden et al. |
| 3,904,666 A | 9/1975 | Schnabel et al. |
| 4,326,987 A | 4/1982 | Hendricks et al. |
| 4,508,637 A | 4/1985 | Heintzelman et al. |
| 4,709,003 A | 11/1987 | Scott, Jr. et al. |
| 4,737,527 A | 4/1988 | Maranci |
| 4,781,947 A | 11/1988 | Saito et al. |
| 4,801,663 A | 1/1989 | Ueyanagi et al. |
| 6,013,730 A | 1/2000 | McGrail et al. |
| 6,429,157 B1 | 8/2002 | Kishi et al. |
| 7,595,362 B2 | 9/2009 | Kawabe et al. |
| 8,021,752 B2 | 9/2011 | Honda et al. |
| 8,328,977 B2 | 12/2012 | Defoort et al. |
| 2005/0271874 A1 | 12/2005 | Sakajiri et al. |
| 2010/0092695 A1* | 4/2010 | Schultz ...................... C08J 5/06 427/569 |
| 2012/0058325 A1 | 3/2012 | Honma et al. |
| 2013/0062045 A1 | 3/2013 | Chu et al. |
| 2013/0196162 A1 | 8/2013 | Yanan et al. |
| 2013/0224470 A1* | 8/2013 | Vautard ...................... C08J 5/24 428/300.1 |
| 2016/0257797 A1* | 9/2016 | Vautard ...................... C08J 5/06 |
| 2016/0319986 A1* | 11/2016 | Horndler .............. A61B 8/4405 |

FOREIGN PATENT DOCUMENTS

| CA | 1306320 | 8/1992 |
| JP | 3-287684 | 12/1991 |
| JP | 2688625 | 8/1997 |
| JP | 2002-212320 | 7/2002 |
| JP | 2004-277724 | 10/2004 |
| JP | 4263570 | 2/2009 |

OTHER PUBLICATIONS

Allred R.E. et al., "Aqueous-Based Emulsion Reactive Finishes for Improving Carbon/Vinyl Ester Interfacial Bonding", *Proc. 50th Intl. SAMPE Symp. and Exhib*, Long Beach, CA, 16 pages (May 1-5, 2005).
Broyles N.S. et al., "Fatigue Performance of Carbon Fibre/Vinyl Ester Composites: the Effect of Two Dissimilar Polymeric Sizing Agents", *Polymer*, 39(15):3417-3424 (1998).
Ikram S. et al., "Mechanical and Thermal Properties of Chemically Modified Epoxy Resin", *Open Journal of Synthesis Theory and Applications* 1:36-43 (2012).
Kang H.M. et al., "Plasma Etching and Plasma Polymerization Coating of Carbon Fibers. Part 1. Interfacial Adhesion Study", *J. Adhesion Sci. Technol.*, 16(13):1809-1823 (2002).
Kang H.M. et al., "Effect of Solubility and Miscibility on the Adhesion Behavior of Polymer-Coated Carbon Fibers With Vinyl Ester Resins", *Journal of Applied Polymer Science*, 79:1042-1053 (2001).
Kim I-C et al., "Enhanced Interfacial Adhesion of Carbon Fibers to Vinyl Ester Resin Using Poly(Arylene Ether Phosphine Oxide) Coatings as Adhesion Promoters", *J. Adhesion Sci. Technol.*, 14(4):545-559 (2000).
Pang J-L et al., "Theoretical Study on Reaction Mechanism of Isocyanate Radical NCO With Ethene", *International Journal of Quantum Chemistry* 109:801-810 (2009).
Robertson M.A.F. et al., "Designed Interphase Regions in Carbon Fiber Reinforced Vinyl Ester Matrix Composites", *J. Adhesion*, 71:395-416 (1999).

(Continued)

*Primary Examiner* — Hannah Pak
(74) *Attorney, Agent, or Firm* — Scully Scott Murphy & Presser (57) ABSTRACT

A functionalized carbon fiber having covalently bound on its surface a sizing agent containing epoxy groups, at least some of which are engaged in covalent bonds with crosslinking molecules, wherein each of said crosslinking molecules possesses at least two epoxy-reactive groups and at least one free functional group reactive with functional groups of a polymer matrix in which the carbon fiber is to be incorporated, wherein at least a portion of said crosslinking molecules are engaged, via at least two of their epoxy-reactive groups, in crosslinking bonds between at least two epoxy groups of the sizing agent. Composites comprised of these functionalized carbon fibers embedded in a polymeric matrix are also described. Methods for producing the functionalized carbon fibers and composites thereof are also described.

16 Claims, 3 Drawing Sheets

(56) References Cited

OTHER PUBLICATIONS

Vautard F. et al., Major Accomplishments in Composite Materials and Sandwich Structures: An Anthology of ONR Sponsored Research "Carbon-Fiber-Vinyl Ester Interfacial Adhesion Improvement by the Use of an Epoxy Coating", *Springer Science+Business Media B. V.*, I.M. Daniel et al. (eds.), pp. 27-50 (2009).

Vautard F. et al., "Carbon Fiber-Vinyl Ester Interfacial Adhesion Improvement by the Use of a Reactive Epoxy Coating", *Proc. 17th Intl. Conf. on Composite Materials* (ICCM 17), Edinburgh, UK 11 pages (Jul. 27-31, 2009).

Verghese K.N.E. et al., "Pultruded Carbon Fiber/Vinyl Ester Composites Processed With Different Fiber Sizing Agents. Part II: Enviro-Mechanical Durability", *Journal of Materials in Civil Engineering*, 17(3):334-342 (Jun. 1, 2005).

Yamada K. et al., "Plasma-Graft Polymerization of a Monomer With Double Bonds onto the Surface of Carbon Fiber and its Adhesion to a Vinyl Ester Resin", *Journal of Applied Polymer Science*, 90:2415-2419 (2003).

\* cited by examiner

MULTIFUNCTIONAL CURING AGENTS AND THEIR USE IN IMPROVING STRENGTH OF COMPOSITES CONTAINING CARBON FIBERS EMBEDDED IN A POLYMERIC MATRIX

This invention was made with government support under Prime Contract No. DE-AC05-00OR22725 awarded by the U.S. Department of Energy. The government has certain rights in the invention.

FIELD OF THE INVENTION

The present invention relates, generally, to composites made of carbon fibers and a polymeric matrix, and also to the use of sizing agents in order to modify the interfacial interactions between two phases of a solid composite.

BACKGROUND OF THE INVENTION

Carbon fiber reinforced composites are known for their outstanding mechanical properties associated with a low density. Some of those outstanding mechanical properties include superior tensile, flexural, and shear properties and impact resistance. For this reason, they have been of interest to many fields, particularly for rugged applications, such as the space and aeronautics industries, military equipment, transportation, and infrastructure.

Carbon fiber-epoxy composites are particularly used in such rugged applications. Although there has been a desire to extend the application of carbon fiber-epoxy composites to more commonplace markets, such as the automotive industry, tools, appliances, and sporting and recreational goods, their extension into these other markets has been substantially impeded by the higher cost of high performance epoxy resins relative to other resin systems. Less costly substitutes of epoxy resin have been sought, but the mechanical properties of these substitutes have thus far not approached the outstanding mechanical properties provided by high performance epoxy resins.

Vinyl ester resins are less costly than high performance epoxy resins, and are widely used, particularly because of their high resistance to moisture absorption and corrosion. Thus, vinyl ester resins would be a highly desirable substitute for an epoxy resin if only the resulting carbon fiber-vinyl ester resin composite could approach the outstanding mechanical properties provided by epoxy resin-based composites. However, the mechanical properties of carbon fiber-vinyl ester composites cannot currently compete with the mechanical properties of carbon fiber-epoxy composites. For this reason, carbon fiber-vinyl ester resin composites have not been considered for applications in which outstanding mechanical properties (e.g., high strength and ruggedness) are required.

The physico-chemical and mechanical properties of a composite material are not only dependent on the characteristics of the reinforcement material and the matrix, but also largely dependent on the properties of the interface. If the fiber-matrix interface is weak, the structural integrity of the composite material will be compromised. Moreover, unlike high performance epoxy resins, and particularly in the case of a vinyl ester resin matrix, a high cure volume shrinkage can further diminish the integrity of the fiber-matrix interface. Thus, methodologies for improving a fiber-matrix interface in an epoxy matrix are generally not applicable for a vinyl ester resin or other type of matrix. For this reason, vinyl ester resin composites have been largely unconsidered for rugged applications, although vinyl ester resins are less costly than high performance epoxy resins. Hence, a great benefit would be provided by a methodology that could significantly strengthen the fiber-matrix interface in composites containing any of a variety of polymeric matrix materials, including vinyl ester resins, unsaturated polyester resins, vinyl addition polymers, and more.

SUMMARY OF THE INVENTION

In one aspect, the invention is directed to a carbon fiber having covalently bound on its surface a sizing agent containing epoxy groups, at least some of which are engaged in covalent bonds with crosslinking molecules. The crosslinking molecules possess reactive groups that function to crosslink between epoxy groups in the sizing agent and also function to crosslink between the sizing agent and a polymer matrix. To accomplish this, each of the crosslinking molecules possesses at least two epoxy-reactive groups and at least one free functional group reactive with functional groups of a polymer matrix in which the carbon fiber is to be incorporated. At least a portion of the crosslinking molecules are engaged, via at least two of their epoxy-reactive groups, in crosslinking bonds between at least two epoxy groups of the sizing agent.

In another aspect, the invention is directed to a solid composite in which the above-described functionalized carbon fibers are embedded in a polymeric matrix. The polymeric matrix can be a thermoset or thermoplastic polymer, or more particularly, a vinyl ester resin or an unsaturated polyester resin. In the composite, the at least one free functional group in the crosslinking molecules is crosslinked with functional groups of the polymer matrix. The invention is also directed to a device or apparatus that contains the composite, such as a protective or impact-resistant layer, coating, or film, or an interior or exterior siding or surface of a structure, such as an automobile, aircraft, or building, or a tool or appliance, particularly where a lightweight high-strength material is desired.

In yet another aspect, the invention is directed to a method of making a functionalized carbon fiber having on its surface an at least partially cured sizing agent containing epoxy groups. Generally, the method includes covalently binding on the surface of a carbon fiber a sizing agent containing an epoxy resin, and at least partially curing the sizing agent by contact thereof with a crosslinking molecule possessing at least two epoxy-reactive groups and at least one free functional group reactive with functional groups of a polymer matrix in which the carbon fiber is to be incorporated. After the at least partial curing step, at least a portion of the crosslinking molecules are engaged, via at least two of their epoxy-reactive groups, in crosslinking bonds between at least two epoxy groups of the sizing agent. The at least one free functional group in the crosslinking molecule remains available for subsequent crosslinking with reactive groups of the polymeric matrix. In the method, the at least partial curing step is performed on the sizing agent before or after the sizing agent is covalently bound to the surface of said carbon fiber.

In still another aspect, the invention is directed to a method of making the solid composite described above. The method includes admixing functionalized carbon fibers (i.e., functionalized with an at least partially cured sizing agent), described above, with a polymer precursor resin, and curing the polymer precursor resin to form a cured polymeric matrix that contains the functionalized carbon fibers embedded therein.

DETAILED DESCRIPTION OF THE INVENTION

The carbon fiber can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The invention also applies to two-dimensional carbon materials, e.g., graphene, graphene oxide, graphene nanoribbons, which may be derived from, for example, natural graphite, carbon fibers, carbon nanofibers, single walled carbon nanotubes and multi-walled carbon nanotubes. The carbon fiber considered herein generally possesses a high tensile strength, such as at least 500, 1000, 2000, 3000, 5000, 10,000 or 20,000 MPa, with a degree of stiffness preferably of the order of steel or higher (e.g., 100-1000 GPa).

For purposes of the instant invention, the carbon fibers preferably have epoxy-reactive groups on their surfaces engaged in covalent bonds with the epoxy-containing sizing agent. Some examples of epoxy-reactive groups include hydroxyl (OH), carboxyl (COOH), and amino (e.g., $NH_2$) groups, any of which can be on the surface of the carbon fiber. Carbon fibers can be surface-functionalized with such reactive groups by methods well known in the art, such as by an oxidative surface treatment. Moreover, such surface-functionalized carbon fibers are also commercially available.

Preferably, the epoxy resin covalently bound to the carbon fiber surface possesses at least two epoxide (epoxy) groups (i.e., prior to binding and crosslinking), and thus, can be a difunctional, trifunctional, tetrafunctional, or a higher functional epoxy resin. When covalently bound to the carbon fiber, the epoxy resin is bound via a portion of its epoxy groups, with a portion of epoxy groups available for further reaction (e.g., crosslinking). In some embodiments, the epoxide group is present as a glycidyl group. The epoxy resin (i.e., before covalent bonding to the carbon fiber or crosslinking) can be conveniently expressed by the following generic structure:

(1)

In Formula (1), n is precisely or at least 1, 2, 3, 4, 5, 6, or any suitable number, including a higher number (e.g., 10, 20, 30, 40, or 50) typical for a polymer having epoxide-containing units. The group R is a saturated or unsaturated hydrocarbon linking group having at least one and up to any suitable number of carbon atoms. In different embodiments, R can have precisely or at least, for example, 1, 2, 3, 4, 5, 6, 7, 8, 9, 10, 12, 15, 18, 20, 25, 30, 35, 40, or 50 carbon atoms, or a number of carbon atoms within a range bounded by any two of these values. Some examples of saturated hydrocarbon groups suitable as R include straight-chained or branched alkylene groups or cycloalkylene groups, such as methylene (i.e., —$CH_2$—), ethylene (i.e., —$CH_2CH_2$—), n-propylene (i.e., —$CH_2CH_2CH_2$—, or "trimethylene"), isopropylene (—$CH(CH_3)CH_2$—), tetramethylene, pentamethylene, hexamethylene, —$C(CH_3)_2CH_2$—, —$CH(CH_3)CH(CH_3)$—, —$CH_2C(CH_3)_2CH_2$—, cyclopropylene (i.e., cyclopropyldiyl), 1,3-cyclobutylene, 1,2-cyclopentylene, 1,3-cyclopentylene, 1,2-cyclohexylene, 1,3-cyclohexylene, and 1,4-cyclohexylene. Some examples of unsaturated hydrocarbon groups having 1 to 4 carbon atoms include straight-chained or branched alkenylene or alkynylene groups or cycloalkenylene groups, such as vinylene (—CH=CH—), allylene (—$CH_2$—CH=CH—), —$CH_2$—$CH_2$—CH=CH—, —$CH_2$—CH=CH—$CH_2$—, —CH=CH—CH=CH—, ethynyl, ethynyl-containing hydrocarbon groups, 1,3-cyclopentenediyl, 1,4-cyclohexenediyl, as well as aromatic linking groups, such as 1,2-, 1,3-, and 1,4-phenylene, 4,4'-biphenylene, naphthalen-1,5-diyl, and bisphenol A ether groups. Any two, three, or more linking groups identified above can be linked together as well, such as two methylene groups on a phenylene group, i.e., —$CH_2$—$C_6H_4$—$CH_2$—.

The foregoing exemplified linking groups for R are suitable for linking two epoxide groups. However, a generic set of trifunctional, tetrafunctional, and higher functional epoxy resins are also considered herein wherein one, two, or a higher number of hydrogen atoms from any of the exemplified linking groups provided above for R are replaced by one, two, or a higher number of epoxide groups, respectively (e.g., 1,3,5-triglycidylbenzene).

In some embodiments, the hydrocarbon group R contains only carbon and hydrogen atoms. In other embodiments, the hydrocarbon group R also includes one, two, three, or more heteroatoms or heteroatom groups. The heteroatoms are typically one or more selected from oxygen (O), nitrogen (N), sulfur (S), or a halogen, such as, for example, fluorine, chlorine, bromine, and iodine atoms. Heteroatoms can be included as, for example, ether (—O—), amino (—NH—, —N=, or as a tertiary amine group), or thioether. Some heteroatom groups include hydroxy (OH), carbonyl (—C(=O)—), organoester (—C(=O)O—), amide (—C(=O)NH—), urea, carbamate, and the like. The heteroatom or heteroatom-containing group can either insert between two carbon atoms engaged in a bond, or between carbon and hydrogen atoms engaged in a bond, or replace a carbon or hydrogen atom. A particular example of a linking group R containing two oxygen atoms is bisphenol A and its derivatives, which are typically functionalized with glycidyl groups via ether bonds.

In particular embodiments, the epoxy resin is a glycidyl derivative, which can be conveniently expressed as a subgeneric formula of Formula (1) above by the following structural formula:

(1a)

The glycidyl derivative can be any of those compounds containing glycidyl groups, typically produced by reacting epichlorohydrin with a polyhydric molecule, such as a dihydric, trihydric, or tetrahydric molecule. The polyhydric molecule can be, for example, a polyhydric alcohol, i.e., polyol (e.g., diol, triol, or tetrol, or generically defined as R—(OH)$_n$ where n is as above except that it is a minimum of 2), polyamine (e.g., diamine, triamine, or tetramine), or polycarboxylic acid (e.g., malonic, succinic, glutaric, adipic, or terephthalic acids).

Some particular examples of difunctional epoxy resins include diglycidyl ethers of a diol (i.e., glycol), wherein some examples of diols include ethylene glycol, diethylene glycol, triethylene glycol, propylene glycol, 1,3-propanediol, 1,4-butanediol, 1,5-pentanediol, 1,6-hexanediol, tetraethylene glycol, pentaethylene glycol, bisphenol A, bisphenol AF, bisphenol F, bisphenol S, neopentyl glycol, 2,2,4,4-tetramethyl-1,3-cyclobutanediol, catechol, resorcinol, dihydroxyquinone, thiodiglycol, and 4,4'-dihydroxybiphenyl. Some epoxy prepolymer resins are of the following general formula, wherein m can be 0, 1, 2, 3, 4, 5, 10, or a number up to, for example, 20, 25, 30, 40, or 50 or a number within a range bounded by any two of these values:

(2)

Some particular examples of trifunctional and tetrafunctional epoxy resins include triglycidyl and tetraglycidyl ethers of a triol or tetrol, respectively, wherein some examples of triols include glycerol, 1,3,5-trihydroxybenzene (phloroglucinol), trimethylolethane, trimethylolpropane, triethanolamine, and 1,3,5-triazine-2,4,6-triol (cyanuric acid). An example of a tetrol is pentaerythritol.

The difunctional, trifunctional, tetrafunctional, or higher functional epoxy resin can also be, for example, a diglycidyl, triglycidyl, tetraglycidyl, or higher polyglycidyl ether of a phenol novolak resin or bisphenol A novolak resin. Such resins are well known in the art, as described, for example, in U.S. Pat. No. 6,013,730, which is herein incorporated by reference in its entirety.

In some embodiments, one of the di-, tri-, tetra-, or higher glycidylated materials described above is used as a primer to coat (and bond with) the carbon fiber, and a second (i.e., overlayer) of di-, tri-, tetra-, or higher glycidylated material is coated onto the primer. Typically, a thermal treatment is applied after applying the primer coat and before applying the overlayer. For example, in some embodiments, ethylene glycol diglycidyl ether is applied as a primer onto the carbon fiber surface, a thermal treatment is applied, followed by an overlayer of a different glycidylated material, such as bisphenol A diglycidyl ether. In a more particular embodiment, the carbon fiber surface is grafted with epoxide groups, such as by treatment with a solution (e.g., 0.5%, 1%, or 2% by weight) of ethylene glycol diglycidyl ether in water or aqueous solution, while undergoing (or followed) by thermal treatment of the wet carbon fibers at an elevated temperature of, for example, 80° C., 90° C., 100° C., 110° C., 120° C., 130° C., 140° C., 150° C., 160° C., 170° C., or 180° C., or a temperature within a range bounded by any two of the foregoing values, before coating with an overlayer of a different glycidylated material. The advantage of the foregoing primer process is that it provides a denser covalent grafting of epoxide groups at the surface of the fiber, which increases the number of covalent binding sites between the epoxy sizing and carbon fiber surface.

The epoxy-containing sizing agent, described above, is completely or partially crosslinked (i.e., completely or partially cured) with crosslinking molecules (curing agents) possessing at least two, three, four, or more epoxy-reactive groups and at least one free functional group reactive with functional groups of a polymer matrix in which the carbon fiber is to be (i.e., subsequently) incorporated. In the case of complete crosslinking (i.e., complete curing), the crosslinked sizing agent possesses no free epoxy groups that could be used for further reaction. In the case of partial crosslinking (i.e., partial curing), the crosslinked sizing agent possesses free (i.e., remaining) epoxy groups that could be used for further reaction, such as covalent binding with a precursor polymer matrix into which it is incorporated, or reaction with a bifunctional or multifunctional linking group that facilitates binding with a polymer matrix. The term "crosslinked", as used herein, means that at least two epoxy groups (or perhaps three, four, or more) of the sizing agent are covalently interconnected by a crosslinking molecule via covalent bonds established between the at least two epoxy groups and an equivalent number of epoxy-reactive groups of the crosslinking molecule.

The epoxy-reactive groups in the crosslinking molecule can be any epoxy-reactive group known in the art, such as an isocyanate, hydroxy (e.g., alcohol or phenol), amino (—NH₂ or —NHR, where R is a hydrocarbon group), carboxylic acid (—C(O)OH), thiol (—SH), amide (—C(O)NH₂ or —C(O)NHR) group, or anhydride, or a combination thereof. The at least one free functional group in the crosslinking molecule can be any group, known in the art, that can be reactive with functional groups of a polymer matrix. The at least one free functional group can be, independently, for example, any of the exemplary groups provided above for epoxy-reactive groups, if these groups are reactive with functional groups of the polymer precursor in which the carbon fibers are to be incorporated. For example, if a polymer precursor in which the carbon fibers are being incorporated possesses available hydroxy groups, the at least one free functional group on the crosslinking molecule may be selected as a hydroxy-reactive group, such as isocyanate, carboxylic, or aldehyde; or, as another example, if the polymer precursor in which the carbon fibers are being incorporated possesses available unsaturated carbon-carbon bonds, the at least one free functional group on the crosslinking molecule may be selected as an unsaturated group (e.g., alkenyl or vinyl), to be subsequently crosslinked by vinyl addition polymerization, or the free functional group may be selected as a thiol group, which can react with an unsaturated group of the precursor matrix. In some embodiments, the crosslinking molecules, or a portion thereof, possess at least two, three, or more free functional groups.

In some embodiments, the epoxy-reactive groups in the crosslinking molecule are equivalent to the at least one free functional group. For example, the reactive groups on the crosslinking molecule can be, for example, all isocyanate, all hydroxy, all amino, or all carboxylic groups. In other embodiments, the epoxy-reactive groups and at least one free functional group in the crosslinking molecule are different. For example, the epoxy-reactive groups may be selected from isocyanate, hydroxy, or carboxylic acid groups, while the one or more free functional groups may be selected from crosslinkable unsaturated groups, such as alkenyl, cycloalkenyl, or alkynyl groups; or alternatively, the epoxy-reactive groups may be selected from hydroxy groups, while the one or more free functional groups are selected from amino, carboxylic acid, or carboxylic acid ester groups.

In order for the crosslinking molecules to effect crosslinking between epoxy groups of the sizing agent, at least a portion of the crosslinking molecules are engaged in crosslinking bonds via at least two of their epoxy-reactive groups, wherein the term "at least a portion" or "a portion" can refer to an amount that is above 0% and precisely, about, at least, above, up to, or less than, for example, 1%, 2%, 5%, 10%, 20%, 30%, 40%, 50%, 60%, 70%, 80%, 90%, 95%, 98%, 99%, or 100%. The term "about", as used herein, generally indicates no more than ±10%, 5%, 2%, or 1% of a number, e.g., "about 50%" can mean, in its broadest sense, 45-55%. The crosslinking bond can be any of the resulting bonds, known in the art, resulting from reaction between an epoxy group and epoxy-reactive group. For example, as known in the art, a hydroxy group and epoxy group react to form an ether linkage with pendant hydroxy group by ring opening of the epoxy group; an amino group and epoxy group react to form an amino linkage with pendant hydroxy group by ring opening of the epoxy group; a carboxylic acid group and epoxy group react to form an ester linkage with pendant hydroxy group by ring opening of the epoxy group; and an isocyanate group and epoxy group react to form an oxazolidone ring linkage.

Figure 1A:
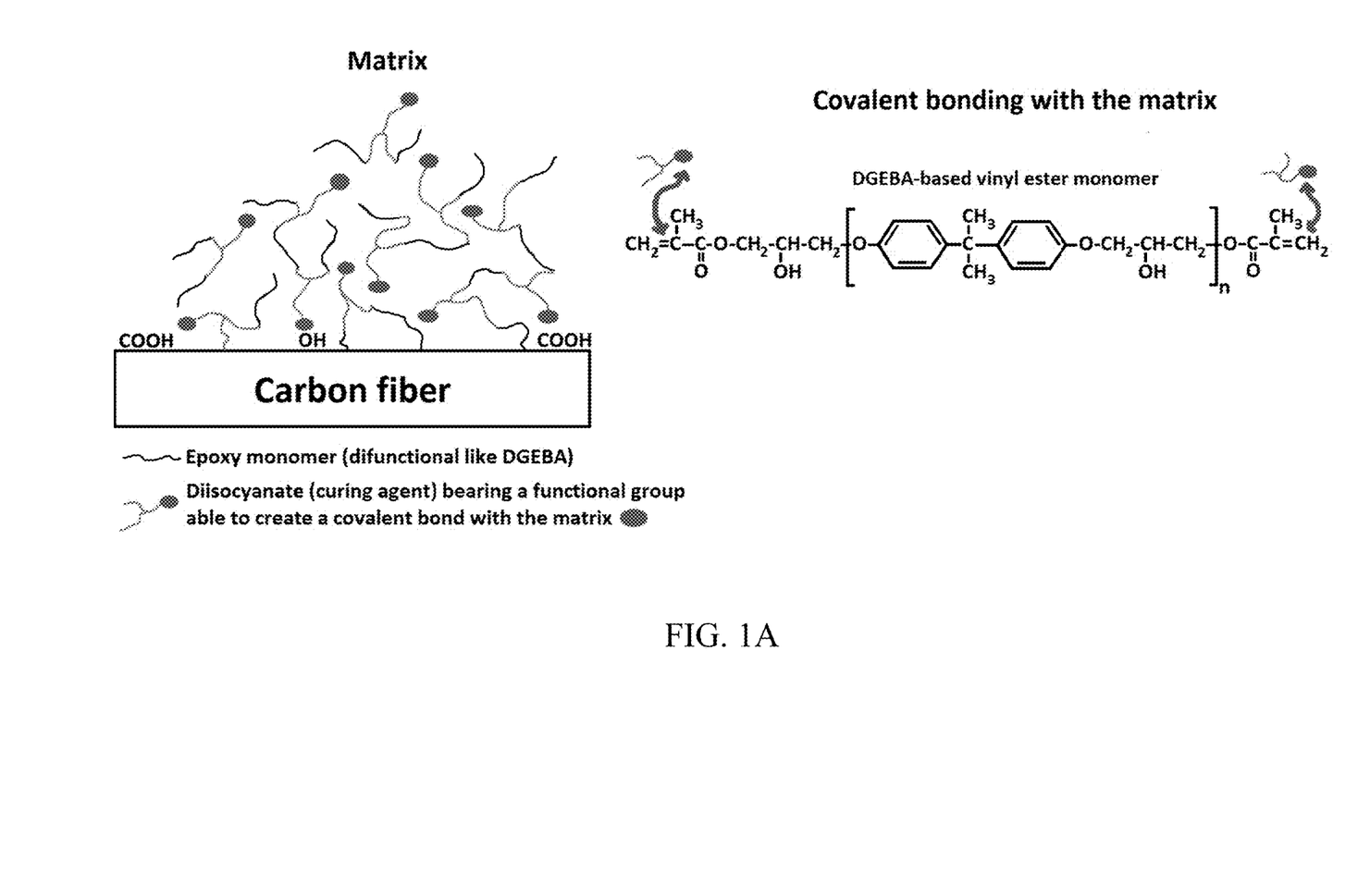
FIGS. 1A, 1B. For FIG. 1A: Schematic of a first exemplary embodiment in which crosslinking molecules bearing at least two epoxy-reactive groups (e.g., isocyanate groups) and at least one matrix-reactive functional group (depicted by solid circle) are crosslinked with an epoxy sizing on a carbon fiber to provide at least one matrix-reactive functional group on the sizing free and available for subsequent reaction with a precursor polymer matrix. For FIG. 1B: Analogous to the scheme shown in FIG. 1A, except that the crosslinking molecule possesses all epoxy-reactive groups, with at least two epoxy-reactive groups forming crosslinking bonds with the epoxy sizing, and at least one epoxy-reactive group forming a crosslinking bond with a precursor polymer matrix.

In a first set of embodiments, at least a portion of the crosslinking molecules possess at least two (e.g., two, three, four, or more) epoxy-reactive groups and at least one non-epoxy-reactive group (e.g., unsaturated group) that functions as a free functional group for subsequent reaction with a precursor polymer matrix, and at least a portion of these crosslinking molecules are engaged via all of their epoxy-reactive groups in an equivalent number of crosslinking bonds with epoxy groups of the sizing agent. Thus, in the latter embodiment, after crosslinking with the epoxy sizing agent, the crosslinking molecules bear at least one free functional group that is not an epoxy-reactive group. The foregoing embodiment is generically depicted in FIG. 1A for the specific case of a diisocyanate crosslinking molecule, wherein the solid circle on the diisocyanate represents the free functional group useful in subsequent crosslinking with a polymer matrix. Although FIG. 1A depicts diisocyanate crosslinking molecules, the isocyanate groups may be replaced with other epoxy-reactive groups (e.g., hydroxy, carboxylic acid, or amino groups). Moreover, the number of isocyanate and/or other epoxy-reactive groups is not limited to two, but may be, for example, three, four, or more, with all epoxy-reactive groups crosslinked with an equivalent number of epoxy groups of the sizing agent for at least a portion of the crosslinking molecules. Likewise, the number of free functional groups may or may not be greater than 1, e.g., 2, 3, or more.

Figure 1B:
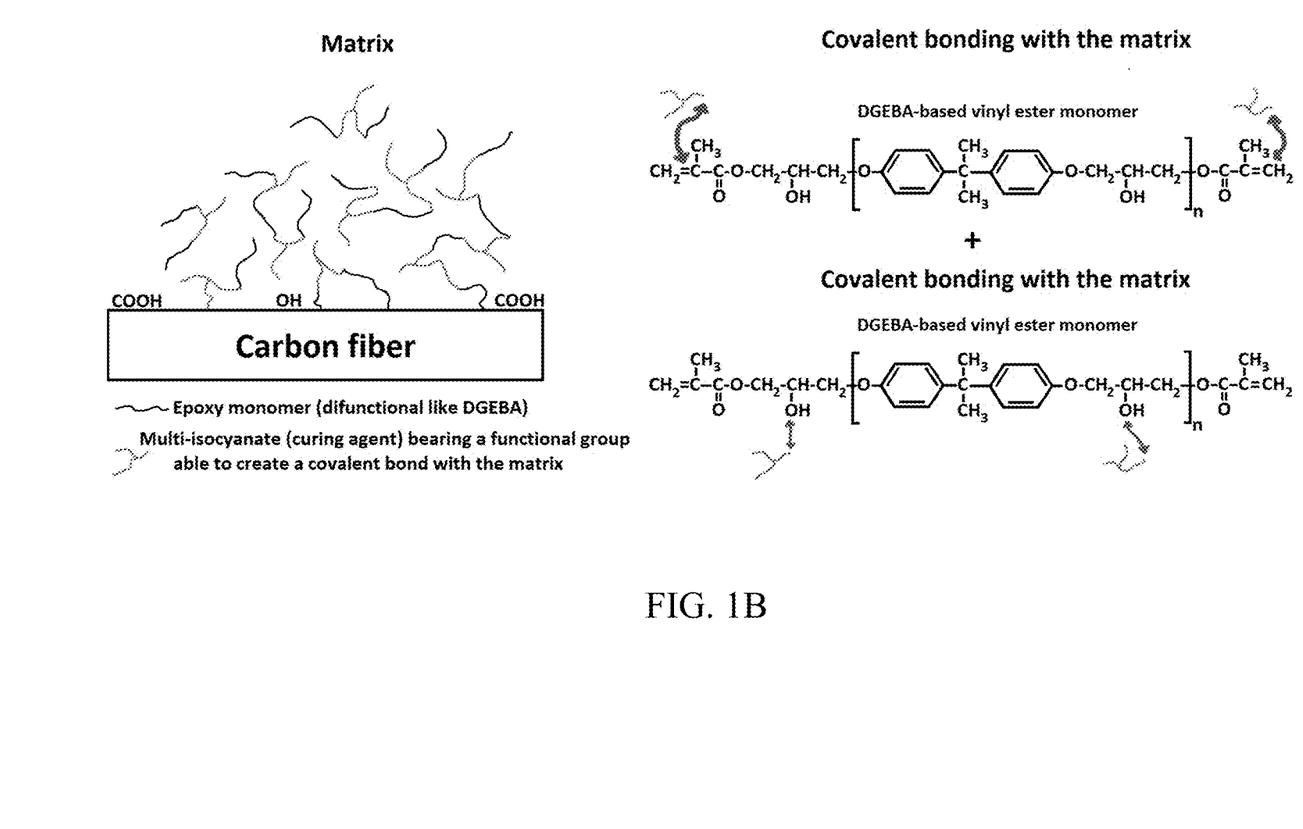

In a second set of embodiments, at least a portion of the crosslinking molecules possess only epoxy-reactive groups. Since at least two of the epoxy-reactive groups of each crosslinking molecule are required to engage in crosslinking bonds with an equivalent number of epoxy groups of the sizing agent, each crosslinking molecule bears at least three (e.g., three, four, five, or more) epoxy-reactive groups in order to permit at least one free epoxy-reactive group to remain after crosslinking with the sizing agent. The free epoxy-reactive group serves as a free functional group useful in subsequent crosslinking with a precursor polymer matrix. Thus, in the latter embodiment, after crosslinking with the epoxy sizing agent, the crosslinking molecules bear at least one free functional group that is an epoxy-reactive group. For example, if the crosslinking molecule is a triisocyanate, at least a portion or all of the triisocyanate molecules, after crosslinking, should bear at least one free isocyanate group for subsequent reaction with a precursor polymer matrix having isocyanate-reactive groups. The foregoing embodiment is also generically depicted in FIG. 1B when the free functional group, represented by the solid circle on the diisocyanate crosslinking molecule, is taken as one or more other isocyanate groups, which corresponds to the crosslinking molecule being a triisocyanate, tetraisocyanate, or higher functional polyisocyanate. As shown, the free isocyanate group may react with a vinyl group, if present, of the precursor polymer matrix by mechanisms known in the art (e.g., J.-L. Pang, et al., *International Journal of Quantum Chemistry*, Vol. 109, 801-810, 2009) and/or with other isocyanate-reactive groups of the precursor polymer matrix (e.g., hydroxy, amine, thiol, amide, or epoxy).

Figure 2:
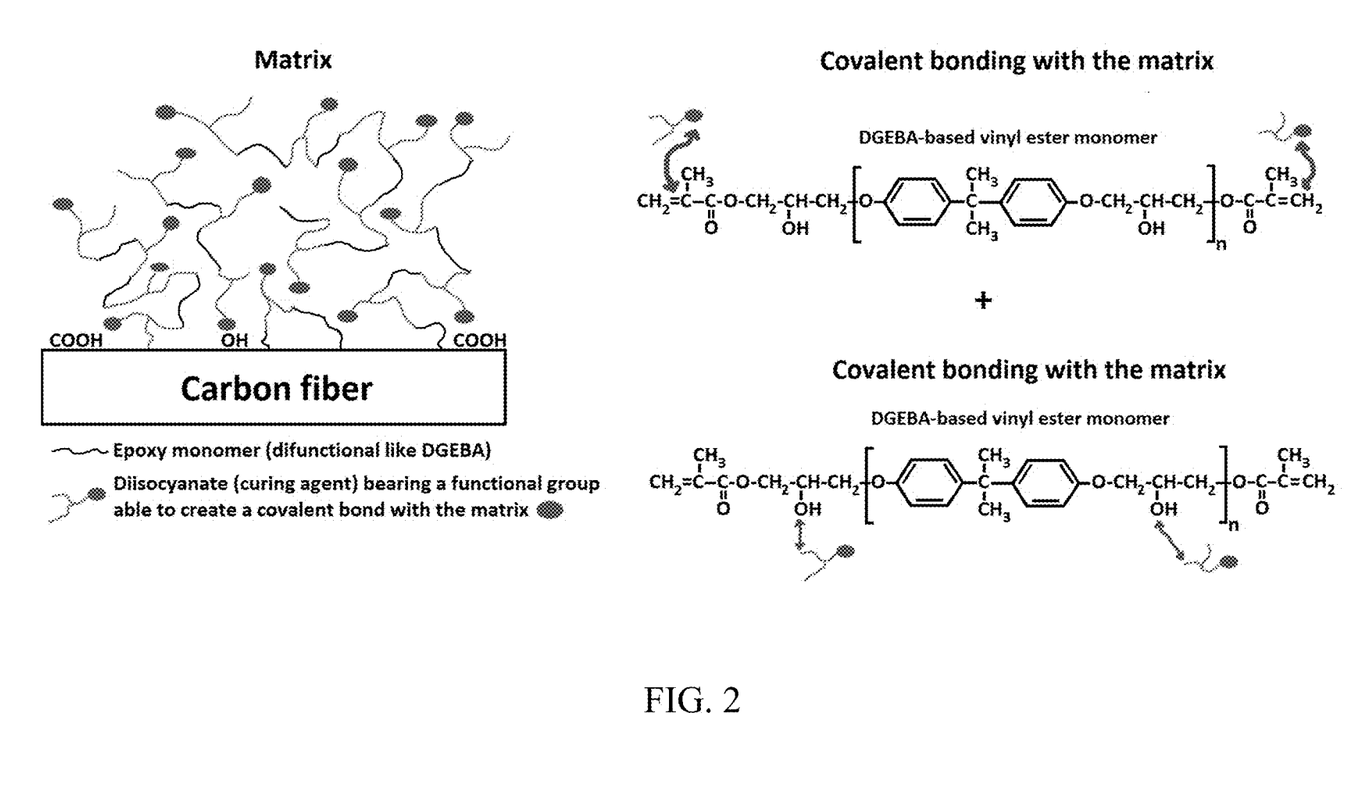
FIG. 2. Schematic of a second exemplary embodiment in which crosslinking molecules bearing at least two epoxy-reactive groups (e.g., isocyanate groups) and at least one matrix-reactive functional group (depicted by solid circle) are crosslinked with an epoxy sizing on a carbon fiber to provide at least one matrix-reactive functional group on the sizing free and available for subsequent reaction with a precursor polymer matrix in addition to at least one free epoxy-reactive group on the sizing that can function to form an additional crosslinking bond with the precursor polymer matrix.

In a third set of embodiments, at least a portion of the crosslinking molecules possess at least two (e.g., two, three, four, or more) epoxy-reactive groups and at least one non-epoxy-reactive group (e.g., unsaturated group) that functions as a free functional group for subsequent reaction with a precursor polymer matrix, and at least a portion of these crosslinking molecules are engaged via less than all of their epoxy-reactive groups in an equivalent number of crosslinking bonds with epoxy groups of the sizing agent. Thus, in the latter embodiment, after crosslinking with the epoxy sizing agent, since less than all of the epoxy-reactive groups of the crosslinking molecules are engaged in crosslinking bonds, the crosslinking molecules, as crosslinked, possess at least one free epoxy-reactive group in addition to the at least one free functional group that is not an epoxy-reactive group. The at least one free epoxy-reactive group on the crosslinking molecules can advantageously also engage in covalent bonding with a polymer matrix in the event the polymer matrix possesses groups reactive with the epoxy-reactive group (e.g., hydroxyl, carboxylic acid, epoxy, or anhydride groups). The foregoing embodiment is generically depicted in FIG. 2 for the specific case of a diisocyanate crosslinking molecule, wherein the solid circle on the diisocyanate represents a free functional (non-epoxy-reactive) group useful in subsequent crosslinking with a polymer matrix. As shown, at least a portion of the crosslinking molecules in FIG. 2, as crosslinked, also bear at least one free epoxy-reactive group in addition to the at least one free functional group that is not an epoxy-reactive group. Although FIG. 2 depicts diisocyanate crosslinking molecules, the isocyanate groups may be replaced with other epoxy-reactive groups (e.g., hydroxy, carboxylic acid, or amino groups). Moreover, the number of isocyanate and/or other epoxy-reactive groups is not limited to two, but may be, for example, three, four, or more, at least one of which remains free in addition to the free functional group that is a non-epoxy-reactive group. In the event that the crosslinking molecules possess two epoxy-reactive groups in addition to a free functional group that is not an epoxy-reactive group, a portion of the crosslinking molecules may be engaged in only one crosslinking bond with epoxy groups of the sizing agent, but, as specified above, at least a portion of the crosslinking molecules should be engaged via at least two crosslinking bonds with epoxy groups of the sizing agent in order to permit at least some crosslinking between epoxy groups.

In one embodiment, the crosslinking molecules, before engaging in crosslinking with the sizing agent, possess at least three isocyanate groups. After crosslinking, at least a portion of the crosslinking molecules are engaged in at least two crosslinking bonds with an equivalent number of epoxy groups of the sizing agent, and, at the same time, at least a portion of the crosslinking molecules possess a free isocyanate group that functions as a free functional group for subsequent reaction with a precursor polymer matrix. Thus, according to the instant disclosure, all of the crosslinking molecules cannot be engaged in crosslinking bonds using all of the isocyanate groups, since this would not leave a free functional group; while, at the same time, all of the crosslinking molecules cannot be engaged in only one crosslinking bond using only one isocyanate group (which would leave at least two free functional groups) because then no crosslinking would occur between epoxy groups. In other embodiments, the foregoing isocyanate groups are replaced with other epoxy-reactive groups, such as selected from hydroxy, carboxylic acid, amino, thiol, and/or amide groups.

In a second embodiment, the crosslinking molecules, before engaging in crosslinking with the sizing agent, possess at least two isocyanate groups and at least one crosslinkable unsaturated group (serving as free functional group). After crosslinking, at least a portion of the crosslinking molecules are engaged in at least two crosslinking bonds with an equivalent number of epoxy groups of the sizing agent. If a portion of the crosslinking molecules are engaged, via less than the at least two isocyanate groups, in crosslinking bonds between epoxy groups, then this portion of crosslinked molecules will possess at least one free isocyanate group in addition to the crosslinkable unsaturated group. In other embodiments, the foregoing isocyanate groups are replaced with other epoxy-reactive groups, such as selected from hydroxy, carboxylic acid, and amino groups. Moreover, in embodiments where the epoxy-reactive groups are selected from hydroxy, carboxylic acid, amino, thiol, and/or amide groups, the unsaturated group may also be replaced with one or more of the aforesaid groups.

Some examples of crosslinking molecules containing three isocyanate groups include toluene-2,4,6-triyl-triisocyanate (CAS 7373-26-4), 2,4,6-trimethyl-benzene-1,3,5-triyl triisocyanate (CAS 65373-49-1), tris(6-isocyanatohexyl) isocyanurate (CAS 3779-63-3), triisocyanate triphenylthiophosphate (CAS 4151-51-3), methylidynetri-p-phenylene triisocyanate (triphenylmethane 4,4',4"-triisocyanate, CAS 2422-91-5), 1,3,5-triazine-2,4,6-triisocyanate, and (2,4,6-trioxotriazine-1,3,5(2H,4H,6H)-triyl)tris(hexamethylene) (CAS 3779-63-3), as well as the numerous aliphatic triisocyanates known in the art (e.g., 4-isocyanate methyl-1,8-octamethylene diisocyanate), as described in U.S. Pat. No. 4,314,048, and the numerous N,N',N"-tris(6-isocyanatohexyl)-isocyanurates known in the art, as described in U.S. Pat. No. 4,801,663, the contents of which are herein incorporated by reference in their entirety. Some examples of crosslinking molecules containing four isocyanate groups include tetraisocyanatosilane (CAS 3410-77-3), 4,4'-benzylidenebis(6-methyl-m-phenylene) tetraisocyanate (CAS 28886-07-9), (benzene,1,1'-(phenylmethylene)bis[2,4-diisocyanato-5-methyl-) (CAS 28886-07-9), and the numerous triphenylmethane tetraisocyanate derivatives known in the art, as described in U.S. Pat. Nos. 3,707,486 and 3,763,110, the numerous methylene-bridged aromatic tetraisocyanate compositions described in U.S. Pat. No. 3,904,666, as well as those described in U.S. Pat. No. 3,763,110, the contents of which are herein incorporated by reference in their entirety. Some examples of crosslinking molecules containing more than four isocyanate groups are the polyisocyanates, as known in the art, such as polymethylene polyphenyl polyisocyanate (CAS 9016-87-9) and those described in U.S. Pat. No. 4,801,663, the contents of which are herein incorporated by reference in their entirety. According to the instant disclosure, after the isocyanate-containing crosslinking molecule, described above, has been crosslinked with the epoxy sizing agent, at least a portion of the crosslinking molecules possess at least one free (available) isocyanate group that can be used for subsequent crosslinking to a precursor polymer matrix containing isocyanate-reactive groups (e.g., hydroxy, carboxylic acid, amino, thiol, and/or amide groups).

Some examples of crosslinking molecules containing at least two isocyanate groups and at least one unsaturated group include 4-cyclohexene-1,2-dicarbonyl diisocyanate (CAS 63712-56-1), cyclohexene-1,4-diisocyanate, 4,4'-dicyclohexene methane diisocyanate, cyclopentene-1,3-diisocyanate, and those under the trade name Desmolux®. Several of these types of unsaturated polyisocyanates are described in, for example, U.S. Application Pub. No. 2013/0196162, the contents of which are herein incorporated by reference. Methods for producing such alkenyl isocyanates are also well known in the art, as evidenced by U.S. Pat. Nos. 2,958,704 and 3,898,258, the contents of which are herein incorporated by reference in their entirety. In some embodiments, the unsaturated group is preferably in a terminal position in order for the unsaturated group to be more available for subsequent reaction. According to the instant disclosure, after the unsaturated isocyanate-containing crosslinking molecule, described above, has been crosslinked with the epoxy sizing agent, the crosslinking molecules possess at least one free (available) unsaturated group that can be used for subsequent crosslinking to a precursor polymer matrix containing groups reactive with the free unsaturated group, and may or may not also contain one or more free isocyanate groups, as long as at least a portion of the crosslinking molecules are crosslinked via at least two of their isocyanate groups.

Some examples of crosslinking molecules containing three hydroxy groups include glycerol (as well as the ethylene oxide or propylene oxide triols based on glycerol), trimethylol methane, phloroglucinol, cyanuric acid, 1,3,5-pentanetriol, 3-methyl-1,3,5-pentanetriol, 1,4,7-heptanetriol, 1,2,7-heptanetriol, and 1,2,4-cyclohexanetriol. Some examples of crosslinking molecules containing at least four hydroxy groups include pentaerythritol, 4-(3-hydroxypropyl)-1,4,7-heptanetriol, 7-(4-hydroxyphenyl)-1,2,7-heptanetriol, 2,2,4,4,-pentanetetrol, 1,1,1,5,5,5-hexafluoro-2,2,4,4-pentanetetrol, 2,4-dimethyl-1,2,4,5-pentanetetrol, 1,1,5,5-pentanetetrol, 1,1,7,7-heptanetetrol, 1,3,5,6-heptanetetrol, the tetrahydroxylated benzenes (e.g., 1,2,4,5-tetrahydroxybenzene), 3-(2-hydroxyethyl)-4-methyl-1,2,3,4-pentanetetrol, the hydroxyl-terminated polybutadienes, and polyester polyols (e.g., polycaprolactone tetrols). The crosslinking molecule may also contain more than four hydroxy groups, as in 1,2,3,4,5-pentahydroxypentane (xylitol). Any of the foregoing exemplary crosslinking molecules may also have one or more hydroxy groups replaced with, for example, one or more amino, carboxylic acid, thiol, or amide groups. Some examples of such bifunctional crosslinking molecules include 3-amino-1,5-pentanediol, 3-amino-3-(2-hydroxyethyl)-1,5-pentanediol, 3,5-dihydroxyaniline (3,5-dihydroxyphenylamine, CAS 20734-67-2), (3R,4R)-4-amino-5-methylene-1,3,7-heptanetriol, 3,4-dihydroxy-benzeneacetic acid (CAS 102-32-9), 2,2-dihydroxyacetic acid, 3-(2,4-dihydroxyphenyl)propionic acid (CAS 5631-68-5), and the trihydroxybenzoic acids (e.g., gallic acid). According to the instant disclosure, after the hydroxy-containing crosslinking molecule, described above, has been crosslinked with the epoxy sizing agent, at least a portion of the crosslinking molecules possess at least one free (available) hydroxy, amino, carboxylic acid, thiol, or amide group that can be used for subsequent crosslinking to a precursor polymer matrix containing suitably reactive groups.

Some examples of crosslinking molecules containing at least two hydroxy groups and at least one unsaturated group include 2-butene-1,4-diol, 2-butyn-1,4-diol, 3-butene-1,2-diol, 4-pentene-1,2-diol, 4-pentene-1,3-diol, 2-methyl-2-pentene-1,4-diol, 3-fluoro-4-pentene-1,2-diol, 2,4-dimethyl-4-pentene-1,3-diol, 4-pentene-1,2,3-triol, 5-hexene-1,2-diol, 5-hexene-1,3-diol, 5-hexene-1,2,3-triol, 6-heptene-1,2-diol, 2-methyl-6-heptene-1,2-diol, 6-heptene-1,2,3-triol, 1,4-cyclohexenediol, and 1,2-dihydroxycyclohexene. In some embodiments, the unsaturated group is preferably in a terminal position (e.g., in 3-butene-1,2-diol or 4-pentene-1,2-diol) in order for the unsaturated group to be more available for subsequent reaction. According to the instant disclosure, after the unsaturated hydroxy-containing crosslinking molecule, described above, has been crosslinked with the epoxy sizing agent, the crosslinking molecules possess at least one free (available) unsaturated group that can be used for subsequent crosslinking to a precursor polymer matrix containing groups reactive with the free unsaturated group, and may or may not also contain one or more free hydroxy groups, as long as at least a portion of the crosslinking molecules are crosslinked via at least two of their hydroxy groups.

Some examples of crosslinking molecules containing three amino groups include diethylenetriamine (DETA), cyclohexane-1,3,5-triamine, the polyether triamines (e.g., polyoxypropylene triamines), melamine, spermidine, bis(hexamethylene)triamine, 1,2,4-benzenetriamine, and guanidine. Some examples of crosslinking molecules containing four amino groups include triethylenetetramine (TETA), spermine, 1,2,4,5-benzenetetramine, pentane-1,1,1,5-tetraamine, and pentane-1,2,4,5-tetramine. The crosslinking molecule may also contain more than four amino groups, as in the polyamino molecules well known in the art, as evidenced in U.S. Pat. No. 4,709,003, the contents of which are herein incorporated by reference in their entirety. The amino-containing crosslinking molecule may also be an N-alkyl (e.g., N-methyl or N-ethyl) analog, provided that at least two amino groups selected from primary and secondary amines are present in the amino-containing crosslinking molecule before crosslinking. According to the instant disclosure, after the amino-containing crosslinking molecule, described above, has been crosslinked with the epoxy sizing agent, at least a portion of the crosslinking molecules possess at least one free (available) amino group that can be used for subsequent crosslinking to a precursor polymer matrix containing amino-reactive groups (e.g., epoxy, carboxylic acid, carboxylic acid ester, anhydride, or aldehyde groups).

Some examples of crosslinking molecules containing at least two amino groups and at least one unsaturated group include 1,4-diamino-2-butene, N-propyl-1,4-diamino-2-butene, 2-pentene-1,4-diamine, 2-pentene-1,5-diamine, 2-pentene-2-chloro-1,5-diamine, 5-fluoro-2-pentene-1,4-diamine, 5,5-difluoro-2-pentene-1,4-diamine, 4-hexene-1,2-diamine, 2-methyl-1-hexene-1,4-diamine, 2-hexene-1,6-diamine, 3-chloro-3-hexene-1,6-diamine, and 5-hexene-1,2-diamine. In some embodiments, the unsaturated group is preferably in a terminal position (e.g., in 5-hexene-1,2-diamine) in order for the unsaturated group to be more available for subsequent reaction. According to the instant disclosure, after the unsaturated amino-containing crosslinking molecule, described above, has been crosslinked with the epoxy sizing agent, the crosslinking molecules possess at least one free (available) unsaturated group that can be used for subsequent crosslinking to a precursor polymer matrix containing groups reactive with the free unsaturated group, and may or may not also contain one or more free amino groups, as long as at least a portion of the crosslinking molecules are crosslinked via at least two of their amino groups.

Some examples of crosslinking molecules containing three carboxylic acid groups include citric acid, isocitric acid, 1,2,4-cyclohexanetricarboxylic acid, propane-1,2,3-tricarboxylic acid, benzene-1,3,5-tricarboxylic acid (trimeric acid), benzene-1,2,4-tricarboxylic acid (trimellitic acid), and benzene-1,2,3-tricarboxylic acid. Some examples of crosslinking molecules containing four carboxylic acid groups include 1,2,4,5-benzenetetracarboxylic acid, biphenyl-3,3',5,5'-tetracarboxylic acid (CAS 4371-28-2), (18-crown-6)-2,3,11,12-tetracarboxylic acid (CAS 61696-54-6), tetrahydrofuran-2,3,4,5-tetracarboxylic acid (CAS 26106-63-8), and 1,2,3,4-butanetetracarboxylic acid (CAS 1703-58-8). Some examples of crosslinking molecules containing more than four carboxylic acid groups include benzene-1,2,3,4,5-pentacarboxylic acid, benzenehexacarboxylic acid (mellitic acid), 1,2,3,4,5,6-cyclohexanehexacarboxylic acid, and 2-aminobenzo[b]thiophene-3,4,5,6,7-pentacarboxylic acid 3-ethyl 4,5,6,7-tetramethyl ester (CAS 66385-68-0). According to the instant disclosure, after the carboxy-containing crosslinking molecule, described above, has been crosslinked with the epoxy sizing agent, at least a portion of the crosslinking molecules possess at least one free (available) carboxylic acid group that can be used for subsequent crosslinking to a precursor polymer matrix containing suitably reactive groups (e.g., amino, epoxy, or isocyanate groups).

Some examples of crosslinking molecules containing at least two carboxylic acid groups and at least one unsaturated group include aconitic acid, maleic acid, fumaric acid (2-butenedioic acid), 2-vinylmalonic acid, 2-allylmalonic acid (CAS 2583-25-7), 2-butenylmalonic acid, 2-allyl-2-(1-butenyl)malonic acid, 2-allyl-2-ethylmalonic acid, 2,2-di(3-butenyl)malonic acid, 2-(2-pentenyl)malonic acid, 2-(4-pentenyl)malonic acid, 2-methyl-2-(4-pentenyl)malonic acid, 2-allylsuccinic acid, 2-(3-butenyl)succinic acid, 2-(2-butenyl)succinic acid, 2-allylglutaric acid, 3-allylglutaric acid, 2-allyladipic acid, 3-allyladipic acid, 4-allyladipic acid, 2-pentenedioic acid, 2-octenedioic acid, some of which are disclosed in U.S. Pat. Nos. 4,326,987 and 4,508,637, the contents of which are herein incorporated by reference in their entirety. In some embodiments, the unsaturated group is preferably in a terminal position (e.g., in 2-(4-pentenyl) malonic acid) in order for the unsaturated group to be more available for subsequent reaction. According to the instant disclosure, after the unsaturated carboxy-containing crosslinking molecule, described above, has been crosslinked with the epoxy sizing agent, at least a portion of the crosslinking molecules possess at least one free (available) unsaturated group that can be used for subsequent crosslinking to a precursor polymer matrix containing groups reactive with the free unsaturated group, and may or may not also contain one or more free carboxy groups, as long as at least a portion of the crosslinking molecules are crosslinked via at least two of their carboxy groups. The reaction between epoxides and carboxylic acids or between epoxides and anhydrides is typically catalyzed by catalysts that may be amine-based, ammonium-based, phosphonium-based, or metal-based, as further described in W. J. Blank, et al., "Catalysis of the Epoxy-Carboxyl Reaction", International Waterborne High-Solids and Powder Coatings Symposium, Feb. 21-23, 2001, New Orleans, La., USA, the contents of which are herein incorporated by reference in their entirety.

In some embodiments, the crosslinking molecule, described above, is the sole crosslinking (i.e., curing) agent. In other embodiments, the crosslinking molecule, described above, may be used in combination with one or more additional curing (crosslinking) agents that have only two epoxy-reactive groups without a third group that could function as a free functional group or crosslinking group. The additional curing agent can be, for example, a diamine, such as ethylene diamine (EDA), 1,2-diaminopropane, 1,3-diaminopropane, 1,4-diaminobutane, 1,5-diaminopentane, o-, m-, or p-phenylenediamine, methylenedianiline, 3,3'- and 4,4'-diaminodiphenylsulfones, triethylene glycol diamine, tetraethylene glycol diamine (available as polyetheramine JEFFAMINE® D, ED and EDR series of compositions), piperazine, imidazole, 2-methylimidazole, isophoronediamine, m-xylenediamine, as well as their N-alkyl (e.g., N-methyl or N-ethyl) analogs, provided that two amino groups selected from primary and secondary amines are present in the additional curing agent before crosslinking. In other embodiments, the additional curing agent may be a dicarboxylic acid (e.g., oxalic acid, malonic acid, succinic acid, glutaric acid, adipic acid, pimelic acid, suberic acid, or terephthalic acid), a diol (e.g., ethylene glycol, propylene glycol, diethylene glycol, or triethylene glycol), or a diisocyanate (e.g., toluene 2,4-diisocyanate, 1,4-phenylene diisocyanate, methylene diphenyl diisocyanate, isophorone diisocyanate, or 3,3'-dimethyl-4,4'-biphenylene diisocyanate). In some embodiments, any one or more of the above-disclosed classes or specific types of additional curing agents are excluded.

In some embodiments, at least a portion of epoxide groups in the sizing agent are available as uncrosslinked epoxide groups, which corresponds to a fraction conversion (curing degree) of epoxide groups that maintains the sizing agent in flexible form, such as a gel. To maintain the sizing agent in flexible or semi-rigid form, the curing degree of epoxide groups is preferably no more than (or less than) about 0.4, 0.45, 0.5, 0.55, 0.6, 0.65, or 0.7. A curing degree above 0.6, or at or above 0.65 or 0.7, generally results in a sizing agent that is substantially rigid. As used herein, and as generally recognized in the art, the terms "curing degree of epoxide groups" refers to the number of epoxide groups that have undergone ring-opening crosslinking relative to the number of epoxide groups that were originally uncrosslinked before the cure of the epoxy. In different embodiments, the curing degree of epoxide groups is about, up to, less than, at least, or above, for example, 0.95, 0.9, 0.85, 0.8, 0.75, 0.7, 0.65, 0.6, 0.55, 0.5, 0.45, 0.4, 0.35, 0.3, 0.25, 0.2, 0.15, or 0.1, or a curing degree within a range bounded by any two of the foregoing values, or between any of the foregoing values and 1 (wherein a curing degree of 1 corresponds to 100% crosslinking with no uncrosslinked epoxy groups). As used herein, the term "about" generally indicates within ±0.5%, 1%, 2%, 5%, or up to ±10% of the indicated value.

In particular embodiments, about 2 parts of a diisocyanate molecule bearing an aliphatic urethane acrylate moiety (e.g., Desmolux® D 100) and about 1 part of a tetrafunctional epoxy resin sizing agent (e.g., MY721, also known as Araldite®MY721) are reacted so that the ratio of the concentrations of isocyanate groups to epoxide groups in the mix is, for example, precisely or about 0.7, 0.75, 0.8, 0.85, 0.9, or 0.95, or a ratio within a range therein (e.g., 0.75-0.9, or 0.8-0.9, or 0.75-0.85, or 0.8-0.85, or 0.82-0.88, or 0.82-0.86).

In another aspect, the invention is directed to a solid composite in which the surface-functionalized carbon fibers, described above, are embedded (i.e., incorporated) within a polymeric matrix. The polymer of the matrix can be any polymer suitable for use in a high strength application, and may be a thermoplastic or thermoset.

Some particular matrix polymers considered herein are those resulting from vinyl-addition polymerization of an unsaturated precursor resin or unsaturated monomers. By being unsaturated, the precursor resin or monomer contains carbon-carbon double bonds. The polymeric matrix can be derived from, for example, curing any of the acrylate or methacrylate monomers known in the art (e.g., acrylic acid, methacrylic acid, methylmethacrylate, hydroxyethylmethacrylate), acrylonitrile, ethylene, propylene, styrene, divinylbenzene, 1,3-butadiene, cyclopentene, vinyl acetate, vinyl chloride, or a cycloolefin (e.g., cyclohexene, cycloheptene, cyclooctene, or norbornene), or a fluorinated unsaturated monomer, such as vinylidene fluoride, fluoroethylene, or tetrafluoroethylene, or a bromated unsaturated monomer (e.g., DGEBA-based vinyl ester monomer with bromo substitution on the aromatic ring). The polymer matrix can be a homopolymer, or alternatively, a copolymer, e.g., block, random, alternating, or graft copolymer of two or more different types of monomers, such as any of those mentioned above.

The matrix polymer can also be any of the condensation polymers known in the art. The condensation polymer can be, for example, a polyester, polyamide, polyurethane, or phenol-formaldehyde, or a copolymer thereof, or a copolymer with any of the addition polymers described above. In particular embodiments, the matrix polymer is a thermoplastic selected from polyether ether ketone (PEEK), polycarbonates, polymethacrylic acids, polyesters, polylactic acids, polyglycolic acids, thermoplastic polyurethanes, polymethacrylates, polymethylmethacrylates, Nylon 6, Nylon 6,6, polysulfones, polyvinylalcohols and polyimides.

In a first particular embodiment, the matrix polymer is derived from a vinyl ester resin by curing methods well-known in the art. Vinyl ester resins are known to possess terminal carbon-carbon double bonds. As known in the art, a vinyl ester resin is generally formed by reaction between a diepoxide, triepoxide, or higher polyepoxide (e.g., as described above under Formulas 1, 1a, and 2) and an unsaturated monocarboxylic acid, such as acrylic or methacrylic acid. The general process for producing an exemplary difunctional divinyl ester is provided as follows:

(3)

In the above scheme, Formula (3) depicts an exemplary set of difunctional divinyl esters in which R is as defined above and R' is either a bond or a hydrocarbon linker R, as defined above. In particular embodiments, the diepoxy molecule depicted in the above scheme is diglycidyl ether of bisphenol A (DGEBA). The resulting difunctional divinyl ester possesses two distinct reactive functional groups, i.e., vinyl groups and hydroxy groups, either or both of which may be involved in a reaction with the crosslinked sizing agent to form covalent bonds therewith, for covalent incorporation of the carbon fibers. In a first embodiment, the vinyl groups of the difunctional divinyl ester crosslink with vinyl-reactive groups found in free functional groups of the crosslinked sizing agent, e.g., available vinyl groups on the crosslinked sizing agent can undergo vinyl addition crosslinking with vinyl groups in the difunctional divinyl ester (in the latter embodiment, the hydroxy groups of the difunctional divinyl ester may or may not also form covalent bonds with the crosslinked sizing agent depending on whether the crosslinked sizing agent also possesses hydroxy-reactive functional groups). In a second embodiment, the hydroxy groups of the difunctional divinyl ester crosslink with hydroxy-reactive groups found in free functional or epoxy-reactive groups of the crosslinked sizing agent, e.g., available isocyanate, carboxylic acid, carboxylic acid ester, or anhydride groups on the crosslinked sizing agent can react and form covalent bonds with hydroxy groups in the difunctional divinyl ester (in the latter embodiment, the vinyl groups of the difunctional divinyl ester may or may not also form covalent bonds with the crosslinked sizing agent depending on whether the crosslinked sizing agent also possesses functional groups reactive with unsaturated groups). In a third embodiment, both the hydroxy groups and vinyl groups of the difunctional divinyl ester react and form covalent bonds with the crosslinked sizing agent, e.g., vinyl groups of the difunctional divinyl ester crosslink with vinyl-reactive groups found in free functional groups of the crosslinked sizing agent, and hydroxy groups of the difunctional divinyl ester react and form covalent bonds with hydroxy-reactive groups found in free functional or epoxy-reactive groups of the crosslinked sizing agent.

In a second particular embodiment, the matrix polymer is derived from an unsaturated polyester resin. Unsaturated polyester resins are known to possess internal carbon-carbon double bonds. As known in the art, an unsaturated polyester resin is generally formed by reaction between a diol, triol, tetrol, or higher polyol, such as any of the polyols described above, and an unsaturated di- or tri-carboxylic acid, such as maleic, phthalic, isophthalic, or terephthalic acid. The general process for producing an exemplary unsaturated polyester resin is provided as follows:

(4)

In the above scheme, Formula (4) depicts an exemplary set of unsaturated polyester resins in which R is as defined above and R″ is an unsaturated hydrocarbon linker containing a reactive alkenyl group, such as any of the unsaturated hydrocarbon linkers defined for R above containing this feature, and r is generally at least 1, 2, 3, 4, or 5, and up to 6, 7, 8, 9, 10, 12, 15, 18, or 20 (or any range bounded by any two of these values). The diol HO—R—OH shown in the above scheme may be replaced with or combined with a triol, tetrol, or higher functional alcohol, or generically defined as R—(OH)$_n$, where n is as above except that it is a minimum of 2, and the dicarboxy molecule depicted in the above scheme can be replaced with or combined with a tricarboxy or higher carboxy molecule. In particular embodiments, the polyol is selected from a polyethylene glycol, such as ethylene glycol, diethylene glycol, and triethylene glycol, and the polycarboxy is selected from maleic acid, phthalic acid, isophthalic acid, and terephthalic acid. Alkenyl groups of the unsaturated polyester resin can react and crosslink with vinyl-reactive groups found in free functional groups of the crosslinked sizing agent, e.g., available vinyl groups on the crosslinked sizing agent can undergo vinyl addition crosslinking with vinyl groups in the unsaturated polyester resin.

In some embodiments, covalent bonding with the polymer matrix is established only by the presence of crosslinking molecules according to the invention (i.e., by the presence of free functional and/or epoxy-reactive groups), as described above. In other embodiments, one or more bifunctional molecules containing an epoxy-reactive end and a polymer-reactive end are reacted with remaining epoxy groups of the crosslinked sizing to further functionalize the epoxy sizing with groups that can covalently bond with the polymer matrix. For example, the epoxy-functionalized carbon fibers can be reacted with a bifunctional molecule that contains an epoxy-reactive group, for reacting with the sizing agent, as well as an unsaturated group, for reacting (typically, but by no means solely, via vinyl-addition coupling) with the matrix precursor resin. The epoxy-reactive end of the bifunctional molecule becomes bound to the epoxy sizing bonded with the carbon fiber, and the unsaturated portion of the difunctional molecule is free and available for reaction with the matrix precursor resin. In particular embodiments, the difunctional molecule is an alkenyl amine, such as allylamine (2-propen-1-amine), 3-buten-1-amine, or 4-penten-1-amine, or an alkenyl alcohol, such as allyl alcohol (2-propen-1-ol), 3-buten-1-ol, 4-penten-1-ol, or 4-hydroxystyrene. Alternatively, a free functional and/or epoxy-reactive group on the crosslinked sizing agent may be reacted with a bifunctional agent to functionalize the sizing agent with a different group more suitable for reaction with the polymer matrix. For example, if the crosslinked sizing agent possesses only free isocyanate groups, at least a portion thereof may be reacted with an unsaturated alcohol (e.g., 3-buten-1-ol) to functionalize the sizing agent with unsaturated groups in the event that the precursor polymer matrix contains unsaturated groups that can undergo vinyl addition with unsaturated groups of the sizing agent. In some embodiments, any one or more of the above-described classes or specific types of bifunctional molecules are excluded.

In another embodiment, covalent bonding between the carbon fibers and the polymeric matrix is further established by incorporating reactive groups in the matrix precursor resin that react with the sizing agent on the carbon fiber when the carbon fiber and the matrix precursor resin are combined. For example, a bifunctional monomer having an unsaturated portion and an epoxy-reactive portion can be included in the matrix precursor resin. The unsaturated bifunctional monomer can react with components of the matrix precursor resin via its unsaturated end (or other portion), and also covalently bond with available epoxy groups of the epoxy sizing agent on the carbon fibers via its epoxy-reactive end (or other portion). The unsaturated difunctional monomer can be, for example, an amino-containing acrylate or methacrylate, such as 2-aminoethyl methacrylate, 2-(methylamino)ethylmethacrylate, 2-(dimethylamino)-ethylmethacrylate, or any of the alkenyl amine or alkenyl alcohol difunctional molecules described above. The bifunctional molecule can alternatively be, for example, a diisocyanate, such as any of the diisocyanates described above, wherein one of the isocyanate groups of the diisocyanate molecules remains available for reaction with hydroxy or other isocyanate-reactive groups of the polymer matrix after attachment of the diisocyanate to the sizing agent. In some embodiments, any one or more of the above-described classes or specific types of bifunctional molecules are excluded.

In another aspect, the invention is directed to a process for preparing the carbon fiber described above containing an epoxy sizing agent bound to its surface. As discussed above, the original carbon fiber to be reacted with the epoxy sizing agent (i.e., precursor carbon fiber) is surface-functionalized with groups reactive with the sizing agent. The initial functionalization can be provided by, for example, an electrochemical surface treatment, a plasma surface treatment, or an oxidation surface treatment based on oxidative species generated by the thermal decomposition of ozone, the details of which are well known in the art.

The epoxy sizing can be made to covalently bond to the surface of the carbon fiber by reacting its epoxide groups with epoxy-reactive groups located on the carbon fiber surface (e.g., surface hydroxyl, carboxyl, and amino groups, as described above). In other embodiments, a first polymer or molecule containing at least one epoxy group or epoxy-reactive group is reacted with the carbon fiber surface, and then the epoxy sizing is reacted with the first polymer or grafted molecule. The epoxide-reactive group can be, for example, a hydroxyl (e.g., alcohol or phenol), carboxylic acid, thiol, amine, or amide group. For example, an epoxy group can be first grafted at the surface of the fiber by exposing the carbon fiber surface to a solution of ethylene glycol diglycidyl ether (e.g., 0.5 wt %) in water and exposing the wet fiber to a temperature of about 150° C. for about 30 minutes.

The carbon fiber is contacted with the sizing agent under conditions, as known in the art, that permit a covalent bond to be formed between the epoxy sizing agent and reactive groups located on the carbon fiber surface. In a specific embodiment, the carbon fiber is contacted with a solution or emulsion of the sizing agent, wherein the solution or emulsion of the sizing agent includes the sizing agent dispersed in a solvent carrier, e.g., water, a water-soluble solvent (e.g., acetone or methylethylketone), or other polar or non-polar solvent, or a combination thereof or aqueous solution thereof. The sizing agent can be admixed with solvent carrier in any desired concentration, but typically in an amount no more than 30% by weight of the total of sizing agent and solvent carrier, such as 1%, 2%, 5%, 10%, 15%, 20%, or 25% by weight. In particular embodiments, the sizing agent is included in the carrier solution in a concentration of up to or less than 10%, and more preferably, from 1 to 5%, 1 to 4%, 1 to 3%, or 1 to 2%. Generally, a room temperature condition (i.e., from 15-25° C., or about 20° C.) is acceptable, but an elevated temperature may also be used to facilitate bonding. An intermediate processing step, before curing, may also be included, such as a rinsing, drying, or annealing step.

In some embodiments, the carbon fiber is first covalently attached to an uncrosslinked epoxy sizing agent, and the uncrosslinked sizing agent subsequently crosslinked by reacting the sizing agent with a desired amount of cross-linking molecules of the invention. In another embodiment, the carbon fiber is reacted with an epoxy sizing agent that was earlier at least partially crosslinked with a desired amount of crosslinking molecules of the invention and/or other curing agent. In some embodiments, less than the stoichiometric amount of crosslinking molecules is used, in which case uncrosslinked epoxy groups remain on the crosslinked sizing agent. In some embodiments, the amount of crosslinking molecule used provides a curing degree of no more than (or less than) about 0.4, 0.45, 0.5, 0.55, 0.6, 0.65, or 0.7, which retains the sizing agent in flexible to semi-rigid form. Depending on the curing methodology used, the curing step may be conducted at room temperature or at an elevated temperature. The conditions used in curing are well known in the art. A post-processing step, after curing, may also be included, such as a rinsing, drying, or annealing step.

In the above-described process, the sizing agent can be advantageously selectively adjusted in thickness and viscosity by appropriate adjustment in conditions used in the process. For example, the sizing agent can be selectively adjusted in thickness by corresponding adjustment in the concentration of the sizing agent in the solution or emulsion of sizing agent, i.e., lower concentrations generally result in thinner layers of sizing agent and higher concentrations generally result in thicker layers of sizing agent. The sizing agent can be selectively adjusted in viscosity by corresponding adjustment in the amount of crosslinking molecule (with optional additional curing agent) used, i.e., lower amounts of curing agents generally result in lower viscosities, and higher amounts of curing agents generally result in higher viscosities. When chopped carbon fibers are desired, as preferred for use in sheet molding, the thickness and the viscosity of the sizing agent are preferably high enough to make the tow relatively hard and difficult to spread. When long and continuous fibers are desired, the thickness and viscosity of the sizing agent are preferably low enough to make the tow relatively soft and easy to spread. The weight percentage of sizing agent with respect to the sum of sizing agent and carbon fiber is typically less than 1 wt. % for continuous fibers and at or above this amount for chopped fibers, e.g., up to 2, 5, 10, 15, 20, 25, or 30 wt %.

In another aspect, the invention is directed to a process for preparing a composite that contains carbon fibers covalently embedded in a polymer matrix described above. In the method, carbon fibers coated with completely or partially crosslinked epoxy sizing agent are mixed with matrix precursor resin before subjecting the mixture to a curing process. The matrix precursor resin can be any of the precursor resins described above, particularly an unsaturated precursor resin, such as a vinyl ester resin or unsaturated polyester resin. In the curing process, epoxy-reactive and/or free functional groups on the crosslinked sizing agent react and crosslink with suitably reactive groups on the precursor resin.

Particularly in the case of unsaturated precursor matrix resin, it is commonplace to also include an unsaturated reactive diluent as a matrix component prior to curing. The unsaturated reactive diluent typically serves to crosslink portions of the precursor resin and facilitate interdiffusion between the epoxy sizing and polymer matrix, which can further strengthen and harden the matrix in the interphase region. In specific embodiments, the unsaturated reactive diluent is a molecule containing one, two, or three vinyl groups. Some examples of unsaturated reactive diluents include styrene, divinylbenzene, a methacrylate, an acrylate, or a vinyl ester (e.g., vinyl acetate). In some embodiments, any one or more of the above-described classes or specific types of reactive diluents are excluded.

The conditions used in curing such precursor resins are well known in the art, and may rely on, for example, an elevated temperature, radiative exposure (e.g., UV, microwave, or electron beam), or both, as well as the use of an initiator, such as a peroxide (e.g., cumene hydroperoxide, butanone peroxide, t-butylperoxybenzoate, benzoyl peroxide, or MEKP) or Lewis acid (e.g., $BF_3$), and if applicable, a catalyst, such as a metal-containing catalyst, e.g., a ROMP catalyst. In particular embodiments, the curing step is conducted at a temperature selected from 125° C., 130° C., 135° C., 140° C., 145° C., 150° C., 155° C., 160° C., 165° C., 170° C., 175° C., 180° C., or 185° C., or a temperature within a range bounded by any two of these values, for a curing time selected from 0.5, 1.0, 1.5, 2.0, 2.5, or 3.0 hours, or a time within a range bounded by any two of these values, wherein it is understood that higher curing temperatures generally require shorter curing times to achieve the same effect. In some embodiments, a two-step or three-step curing process is used, wherein each step employs a different temperature. Moreover, the cure can be conducted at room temperature with the help of a promoter included in the resin, such as cobalt naphthenate, cobalt octoate, or cobalt acetylacetonate, and can be accelerated by the use of a catalyst, such as N,N-dimethylaniline and similar molecules.

The solid composites described herein preferably possess a significantly increased carbon fiber interlaminar shear strength (ILSS) relative to composites that include the same carbon fiber and epoxy sizing agent with uncured sizing agent. For example, whereas a composite with uncured sizing agent may exhibit an ILSS of about 60 MPa, the instant composites using partially cured epoxy sizing may exhibit an ILSS of at least 70, 80, 90, or 100 MPa, or an ILSS within a range bounded by any two of these values.

Examples have been set forth below for the purpose of illustration and to describe certain specific embodiments of the invention. However, the scope of this invention is not to be in any way limited by the examples set forth herein.

EXAMPLES

Overview of Experiments

Crosslinking molecules (i.e., the curing agent) having pendant reactive functionalities were used to form covalent bonds with a vinyl ester or unsaturated polyester matrix in order to generate stronger bonding between the epoxy sizing (as coated on a carbon fiber) and the polymer matrix. Moreover, if the curing agent is well chosen, it can also generate additional covalent bonding between the epoxy sizing and the carbon fiber surface. For example, isocyanate groups can form covalent bonds with hydroxy and carboxylic acid groups located at the surface of the carbon fiber. If the curing agent contains unsaturated groups (e.g., an acrylate pendant group), the unsaturated group can also form covalent bonds with amine groups located at the surface of the carbon fiber via an aza-Michael reaction. The covalent bonding formed between the epoxy sizing and the polymer matrix and between the carbon fiber surface and crosslinked sizing resulted in an improvement in the interface strength between the carbon fiber and the polymer matrix. As further discussed below, the improved interface strength also resulted in an improvement in the mechanical properties of the corresponding composites.

In experiments described below, pendant acrylate functionalities were grafted onto an epoxy sizing using a diisocyanate crosslinking molecule bearing an aliphatic urethane acrylate moiety (commercial product Desmolux® D 100). The isocyanate functionalities react with epoxide groups by generating oxazolidone groups, and the acrylate functionality can react with a vinyl ester or unsaturated polyester matrix during its polymerization.

Detailed Account of Experiments

Carbon fibers, surface treated and non-sized, were sized with four different types of sizings, including the sizing described in the instant disclosure. The carbon fibers were derived from polyacrylonitrile (PAN) precursor fibers, and possessed a tensile modulus and tensile strength of 242 GPa and 4137 MPa, respectively. The carbon fibers were used in the form of a tow containing 50,000 filaments. HU6-01 is a polyurethane-based thermoplastic sizing, and ATI is a reactive sizing. A partially cured epoxy sizing, with Jeffamine® T-403 as the curing agent, was also investigated for comparative purposes.

A sizing solution was prepared as follows: 37.3 g of Desmolux® D 100 curing agent was added to 15.3 g of epoxy resin Araldite®MY721 (a tetrafunctional epoxy resin), and the components thoroughly mixed. Considering that the weight per epoxide is 113 in the case of MY721 and that the weight per isocyanate is 328 in the case of Desmolux® D 100, the ratio of the concentrations of isocyanate groups to epoxide groups used in the mix was 0.84. The mixture was allowed to stand for 30 minutes at ambient temperature before being dissolved into 4 liters of acetone. The resulting sizing solution had a concentration of 1.6 wt. %. The carbon fibers were then sized with the solution using a sizing unit made of mirror-finished stainless steel rollers, a scraper to remove the excess of sizing, and a multi-gallon capacity bath. After passing through the sizing bath, the fibers were dried in a tubular furnace at 150° C. for a few minutes.

Unidirectional composites were obtained by winding the carbon fibers around a steel frame and placing them in a two-piece steel mold. The fibers were then impregnated with an excess of polyester resin (code name XV3175 by AOC) by layup and the excess of resin was expelled by closing the mold with pressure. The dimensions of the composite samples were controlled by the dimensions of free space in the mold, which was constant. 1.5 wt. % of tert-butylperoxybenzoate (initiator) was earlier added to the resin and thoroughly mixed by the use of a centrifuge (rotation speed: 3000 rpm, time: 4 minutes), with degassing of the mix, since the radical polymerization of polyester resins is very sensitive to oxygen. The mold was then placed in a digitally controlled furnace. The volume concentration of carbon fibers, assuming that the samples were void free, was calculated to be around 60%. The thermal program for the cure was 1 hour at 150° C.

The interlaminar shear strength (ILSS) and the flexural strength of the composites (90° and 0°) were measured according to ASTM D2344 and ASTM 790, respectively. For each carbon fiber-resin system and each test, 10 specimens were tested. As known in the art, the 90° flexural strength is the property that is the most sensitive to interfacial adhesion when considering unidirectional composites (Drzal L. T., Madhukar M. "Fiber matrix adhesion and its relationship to composite mechanical properties", *J. Mater. Sci.*, 28:569-610, 1993)

Among all the sizings that were tested, the one based on the instant disclosure resulted in the best mechanical properties (Table 1). The ILSS was increased from 67 MPa to 97 MPa (+45%) and the 90° flexural strength was increased from 32 MPa to 56 MPa (+75%). An improvement was also evident when comparing to the mechanical properties resulting from an epoxy sizing partially cured with Jeffamine® T-403.

The difference in interfacial adhesion was enough to induce a significant improvement in the 0° flexural strength as well (Table 2), as a result of an increase in the tensile strength and the compressive strength of the corresponding composites. Both types of epoxy sizings showed an increase, from 1126 MPa for the non-sized fibers to 1304 MPa (+16%) for the epoxy sizing partially cured by Jeffamine® T-403, and to 1352 MPa (+20%) for the epoxy partially cured by Desmolux® D 100.

TABLE 1

ILSS and 90° flexural strength obtained with different sizings

|  | No sizing | HU6-01 | ATI | Partially cured epoxy sizing with Jeffamine T-403 | Partially cured epoxy sizing with isocyanate bearing acrylate |
|---|---|---|---|---|---|
| ILSS (Ksi) | 9.7 ± 0.4 | 10.6 ± 0.4 | 11.4 ± 0.4 | 12.2 ± 0.4 | 13.7 ± 0.5 |
|  | 9.6 ± 0.3 | 10.4 ± 0.4 | 11.3 ± 0.3 | 11.7 ± 0.3 | 14.5 ± 0.4 |
| 90° flexural strength (Ksi) | 4.6 ± 0.2 | 5.2 ± 0.3 | 5.2 ± 0.6 | 6.2 ± 0.9 | 8.1 ± 1.2 |
| ILSS (MPa) | 67 ± 3 | 73 ± 3 | 79 ± 3 | 84 ± 3 | 94 ± 4 |
|  | 66 ± 2 | 72 ± 3 | 78 ± 2 | 81 ± 2 | 100 ± 3 |
| 90° flexural strength (MPa) | 32 ± 1 | 36 ± 2 | 36 ± 4 | 43 ± 6 | 56 ± 8 |

TABLE 2

0° flexural strength obtained with different sizings

|  | No sizing | HU6-01 | ATI | Partially cured epoxy sizing with Jeffamine T-403 | Partially cured epoxy sizing with isocyanate bearing acrylate |
|---|---|---|---|---|---|
| 0° flexural strength (Ksi) | 163.3 ± 8.1 | 1187 ± 11.5 | 200.6 ± 13.5 | 189.1 ± 6.3 | 196.1 ± 8.9 |
| 0° flexural strength (MPa) | 1126 ± 56 | 1187 ± 79 | 1383 ± 93 | 1304 ± 43 | 1352 ± 61 |

In separate experiments, a carbon fiber with no sizing was compared with a carbon fiber having an epoxy sizing partially cured with isocyanate-acrylate (Desmolux D 100) crosslinker. The carbon fibers were derived from polyacrylonitrile (PAN) precursor fiber, and were used in the form of a tow containing 12,000 filaments. The tensile modulus and tensile strength of the fibers were 248 GPa and 4510 MPa, respectively. Unidirectional composites were obtained by winding carbon fibers around a steel frame and placing them in a two-piece steel mold. The fibers were then impregnated with an excess of a bisphenol A epoxy acrylate resin (code name Ebecryl® 600 from Cytech) by layup and the excess of resin was expelled by closing the mold with pressure. The resin was previously degassed at 90° C. in primary vacuum. The dimensions of the composite samples were controlled by the dimensions of free space in the mold, which was constant. The mold containing the samples was then exposed to an electron beam produced by a 10 MeV electron accelerator. All ionization experiments were carried out using a dynamic mode, and the dose was adjusted by varying the translation speed of the sample carrier. The curing of each set of samples was performed with a total dose of 100 kGy through four passes of 25 kGy. The volume concentration of carbon fibers, assuming that the samples were void free, was calculated to be around 60%.

The interlaminar shear strength (ILSS) was measured according to ASTM D2344. For each carbon fiber reference, 10 specimens were tested. The sizing based on the instant disclosure resulted in a clear improvement of the mechanical properties, as evidenced by the data in Table 3 below. In particular, the ILSS was increased from 61 MPa to 81 MPa (+33%).

TABLE 3

ILSS results for sized and non-sized fibers.

|  | No sizing | Partially cured epoxy sizing with isocyanate bearing acrylate |
|---|---|---|
| ILSS (Ksi) | 8.7 ± 0.5 | 11.7 ± 0.5 |
|  | 9.0 ± 0.3 | 11.7 ± 0.3 |
| ILSS (MPa) | 60 ± 3 | 81 ± 3 |
|  | 62 ± 2 | 81 ± 2 |

The instantly described approach is facile and straightforward, and is readily integratable in industrial operations. Moreover, the instantly described process is highly cost effective by use of affordable chemicals. Considering the significant amount of carbon-fiber vinyl ester/polyester composites produced each year, the improved process and compositions described herein represent a significant advance in the art of high strength composites.

While there have been shown and described what are at present considered the preferred embodiments of the invention, those skilled in the art may make various changes and modifications which remain within the scope of the invention defined by the appended claims.

What is claimed is:

1. A composition comprising a carbon fiber having covalently bound on its surface a sizing agent containing epoxy groups, with said epoxy groups partially or completely engaged in covalent bonds with crosslinking molecules, wherein each of said crosslinking molecules possesses at least two epoxy-reactive groups and at least one free functional group reactive with functional groups of a polymer matrix in which the carbon fiber is to be incorporated, wherein at least a portion of said crosslinking molecules are engaged, via at least two of their epoxy-reactive groups, in crosslinking bonds between at least two epoxy groups of the sizing agent.

2. The composition of claim 1, wherein said free functional group is an alkenyl group.

3. The composition of claim 1, wherein said free functional group is an isocyanate group.

4. The composition of claim 1, wherein a portion of said crosslinking molecules are engaged, via less than all of their epoxy-reactive groups, in an equivalent number of covalent bonds with said epoxy groups, wherein said crosslinking molecule possesses at least one free epoxy-reactive group in addition to the free functional group.

5. The composition of claim 4, wherein said at least one free epoxy-reactive group is an isocyanate group.

6. The composition of claim 1, wherein said sizing agent is partially cured by having at least a portion of epoxide groups in said sizing agent available as uncrosslinked epoxide groups.

7. The composition of claim 6, wherein the partially cured sizing agent is flexible.

8. The composition of claim 1, wherein said sizing agent is completely cured by having no epoxide groups in said sizing agent available as uncrosslinked epoxide groups.

9. The composition of claim 1, wherein said sizing agent comprises a difunctional or higher functional epoxy resin.

10. A solid composite comprising carbon fibers embedded in a polymeric matrix, wherein said carbon fibers have covalently bound on their surfaces a sizing agent containing epoxy groups, with said epoxy groups partially or completely engaged in covalent bonds with crosslinking molecules, wherein each of said crosslinking molecules possesses at least two epoxy-reactive groups and at least one functional group crosslinked with functional groups of said polymer matrix, wherein at least a portion of said crosslinking molecules are engaged, via at least two of their epoxy-reactive groups, in crosslinking bonds between at least two epoxy groups of the sizing agent.

11. The solid composite of claim 10, wherein said polymeric matrix is a cured vinyl ester resin.

12. The solid composite of claim 10, wherein said polymeric matrix is a cured unsaturated polyester resin.

13. The solid composite of claim 10, wherein said polymeric matrix is a vinyl addition polymer.

14. The solid composite of claim 10, wherein said sizing agent is comprised of a difunctional or higher functional epoxy resin.

15. The solid composite of claim 10, wherein a portion of said crosslinking molecules are engaged, via less than all of their epoxy-reactive groups, in an equivalent number of covalent bonds with said epoxy groups, wherein said crosslinking molecule is crosslinked with said polymeric matrix by at least one of its remaining epoxy-reactive groups in addition to being crosslinked to said polymeric matrix by said at least one functional group.

16. The solid composite of claim 15, wherein said at least one remaining epoxy-reactive group is an isocyanate group, which is in crosslinked form with an isocyanate-reactive group of said polymeric matrix.

* * * * *